(12) United States Patent
Schwarz et al.

(10) Patent No.: US 11,707,074 B2
(45) Date of Patent: Jul. 25, 2023

(54) EDIBLE HYDRATION POD AND METHOD OF MANUFACTURING AN EDIBLE HYDRATION POD

(71) Applicants: Kim Schwarz, Ft. Worth, TX (US); Gerald Schwarz, Ft. Worth, TX (US)

(72) Inventors: Kim Schwarz, Ft. Worth, TX (US); Gerald Schwarz, Ft. Worth, TX (US)

(*) Notice: Subject to any disclaimer, the term of this patent is extended or adjusted under 35 U.S.C. 154(b) by 281 days.

(21) Appl. No.: 17/227,104

(22) Filed: Apr. 9, 2021

(65) Prior Publication Data

US 2021/0315235 A1 Oct. 14, 2021

Related U.S. Application Data

(60) Provisional application No. 63/007,452, filed on Apr. 9, 2020.

(51) Int. Cl.
| | |
|---|---|
| *A23K 40/30* | (2016.01) |
| *A23K 20/163* | (2016.01) |
| *A23K 50/48* | (2016.01) |
| *B65D 85/72* | (2006.01) |
| *A23K 10/26* | (2016.01) |
| *B65D 65/46* | (2006.01) |
| *A23K 10/30* | (2016.01) |

(52) U.S. Cl.
CPC .............. *A23K 40/30* (2016.05); *A23K 10/26* (2016.05); *A23K 10/30* (2016.05); *A23K 20/163* (2016.05); *A23K 50/48* (2016.05); *B65D 65/463* (2013.01); *B65D 85/72* (2013.01)

(58) Field of Classification Search
CPC ...... A23K 40/30; A23K 20/163; A23K 50/48; A23K 10/26; A23K 10/30; B65D 65/463; B65D 65/46; B65D 85/72
See application file for complete search history.

(56) References Cited

U.S. PATENT DOCUMENTS

| | | | |
|---|---|---|---|
| 4,428,927 A | | 1/1984 | Ebert et al. |
| 4,804,542 A | | 2/1989 | Fischer et al. |
| 4,935,243 A | | 6/1990 | Borkan et al. |
| 5,853,757 A | * | 12/1998 | Durand ............... A61K 9/0056 424/451 |
| 6,949,256 B2 | | 9/2005 | Fonkwe et al. |
| 7,226,613 B2 | | 6/2007 | Schleifenbaum et al. |
| 7,662,406 B1 | | 2/2010 | Xie et al. |

(Continued)

FOREIGN PATENT DOCUMENTS

| | | |
|---|---|---|
| CN | 104260991 A | 1/2015 |
| CN | 104688710 B | 1/2018 |

(Continued)

OTHER PUBLICATIONS

Ooho (https://www.youtube.com/watch?v=-J68mz2ag1A) (Year: 2017).*

(Continued)

*Primary Examiner* — Erik Kashnikow
*Assistant Examiner* — Lela S. Davis

(57) ABSTRACT

The disclosure provides edible hydration pods (EHPs) for hydrating animals and a method of manufacturing EHPs. In one example, an EHP directed to dogs is disclosed that includes: (1) a casing and (2) a liquid that is within the casing, wherein the liquid is water and the casing is an edible and digestible casing that is flavored for dogs and has a thickness corresponding to a bite force of dogs.

19 Claims, 3 Drawing Sheets

(56) References Cited

U.S. PATENT DOCUMENTS

| | | | |
|---|---|---|---|
| 7,763,276 | B1 | 7/2010 | Shodai et al. |
| 8,536,199 | B2 | 9/2013 | Greenwald |
| 9,539,205 | B2 | 1/2017 | Haug et al. |
| 9,795,990 | B2 | 10/2017 | Edwards et al. |
| 9,867,779 | B2 | 1/2018 | Zhao et al. |
| 10,369,166 | B2 | 8/2019 | Vecht-Lifshitz |
| 2003/0124225 | A1 | 7/2003 | West et al. |
| 2004/0142073 | A1 | 7/2004 | Buchanan |
| 2009/0199776 | A1* | 8/2009 | Alexander ........... A01K 27/001 119/61.56 |
| 2013/0045246 | A1* | 2/2013 | Edwards ............... A23P 20/17 426/135 |
| 2014/0288495 | A1 | 9/2014 | Olmos |
| 2017/0275070 | A1* | 9/2017 | Solomon ............... B29C 48/08 |
| 2018/0290804 | A1 | 10/2018 | Aldaous et al. |
| 2019/0193928 | A1 | 6/2019 | Broen et al. |

FOREIGN PATENT DOCUMENTS

| | | | | |
|---|---|---|---|---|
| EP | 2219626 | A1 | 8/2010 | |
| EP | 1959763 | B1 | 10/2014 | |
| EP | 2762006 | B1 | 10/2016 | |
| EP | 1429622 | B1 | 6/2017 | |
| WO | WO-2018172781 | A1 * | 9/2018 | ............... A23P 20/10 |

OTHER PUBLICATIONS

Ooho2 (https://www.youtube.com/watch?v=KppS7LRbybw) (Year: 2017).*
Patel (https://www.thebetterindia.com/180797/bengaluru-innovation-edible-water-pod-seaweed-plastic-free-india/) (Year: 2019).*
Shit, et al.; "Edible Polymers: Challenges and Opportunities"; Journal of Polymers, vol. 2014, Article ID 427259, Review Article; http://dx.doi.org/10.1155/2014/427259; May 5, 2014; 14 pgs.
"SOP: Recommendations on the care and handling of the MDC1A mouse model"; Research Papers; https://www.clearh2o.com/product/hydrogel#tab-research; Apr. 6, 2020; 2 pgs.
Barclay; "Let Them Eat Wood! (If It's Turned Into Starch)"; The Salt-NPR, Food for Thought; https://www.npr.org/sections/thesalt/2013/06/03/let-them-ea . . . ; Jun. 5, 2013; 3 pgs.
"Sausage casing"; Wikipedia; https://en.wikipedia.org/wiki/Sausage_casing; Jan. 14, 2020; 3 pgs.
Unnisa, et al.; "A Review on Veggie Caps"; International Journal of Innovative Pharmaceutical Sciences and Research; Review Article; 2014; 47 pgs.
Majee, et al.; "HPMC as Capsule Shell Material: Physicochemical, Pharmaceutical and Biopharmaceutical Properties"; International Journal of Pharmacy and Pharmaceutical Sciences, vol. 9, Issue 10, 1-6; Review Article; NNOVARE Academic Sciences; Aug. 31, 2017; 13 pgs.

* cited by examiner

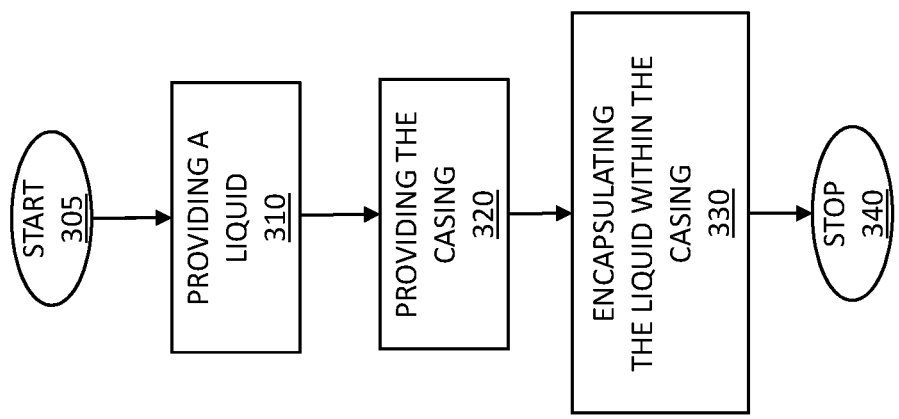

EDIBLE HYDRATION POD AND METHOD OF MANUFACTURING AN EDIBLE HYDRATION POD

CROSS-REFERENCE TO RELATED APPLICATION

This application claims the benefit of U.S. Provisional Application Ser. No. 63/007,452, filed by Kim Schwarz, et al. on Apr. 9, 2020, entitled "AN ADIBLE HYDRATION POD AND METHOD OF MANUFACTURING AN EDIBLE HYDRATION POD," commonly assigned with this application and incorporated herein by reference in its entirety.

TECHNICAL FIELD

This application is directed, in general, to hydrating animals, and, more specifically, to hydrating pets employing a portable solution.

BACKGROUND

Animals need water to live. It is vital for bodily health and functions, such as, receiving nutrients and regulating temperature. A source of water, however, is not always readily available when, for example, people are doing various activities. This forces people to carry their own water for hydration. Other animals, such as pets, also need proper hydration. When enjoying activities together, such as on a walk, people often have to carry water for both them and their pet. This can be cumbersome; especially when toting water bottles.

SUMMARY

In one aspect the disclosure provides an edible hydration pod (EHP). In one example, the EHP includes: (1) a casing, and (2) a liquid that is within the casing, wherein the liquid is water and the casing is an edible casing that is flavored for animals.

In another aspect, the disclosure provides a method of manufacturing an edible hydration pod. In one example the method includes: (1) providing a liquid and (2) encapsulating the liquid within a casing that is digestible by an animal, wherein the casing has a width or diameter greater than one inch.

In yet another aspect, the disclosure provides an edible hydration pod directed to dogs. In one example, the edible hydration pod directed to dogs includes: (1) a casing and (2) a liquid that is within the casing, wherein the liquid is water and the casing is an edible and digestible casing that is flavored for dogs and has a thickness corresponding to a bite force of dogs.

BRIEF DESCRIPTION

Reference is now made to the following descriptions taken in conjunction with the accompanying drawings, in which:

FIG. 3 illustrates a flow diagram of an example of a method of making an EHP carried out according to the principles of the disclosure.

DETAILED DESCRIPTION

Figure 1:
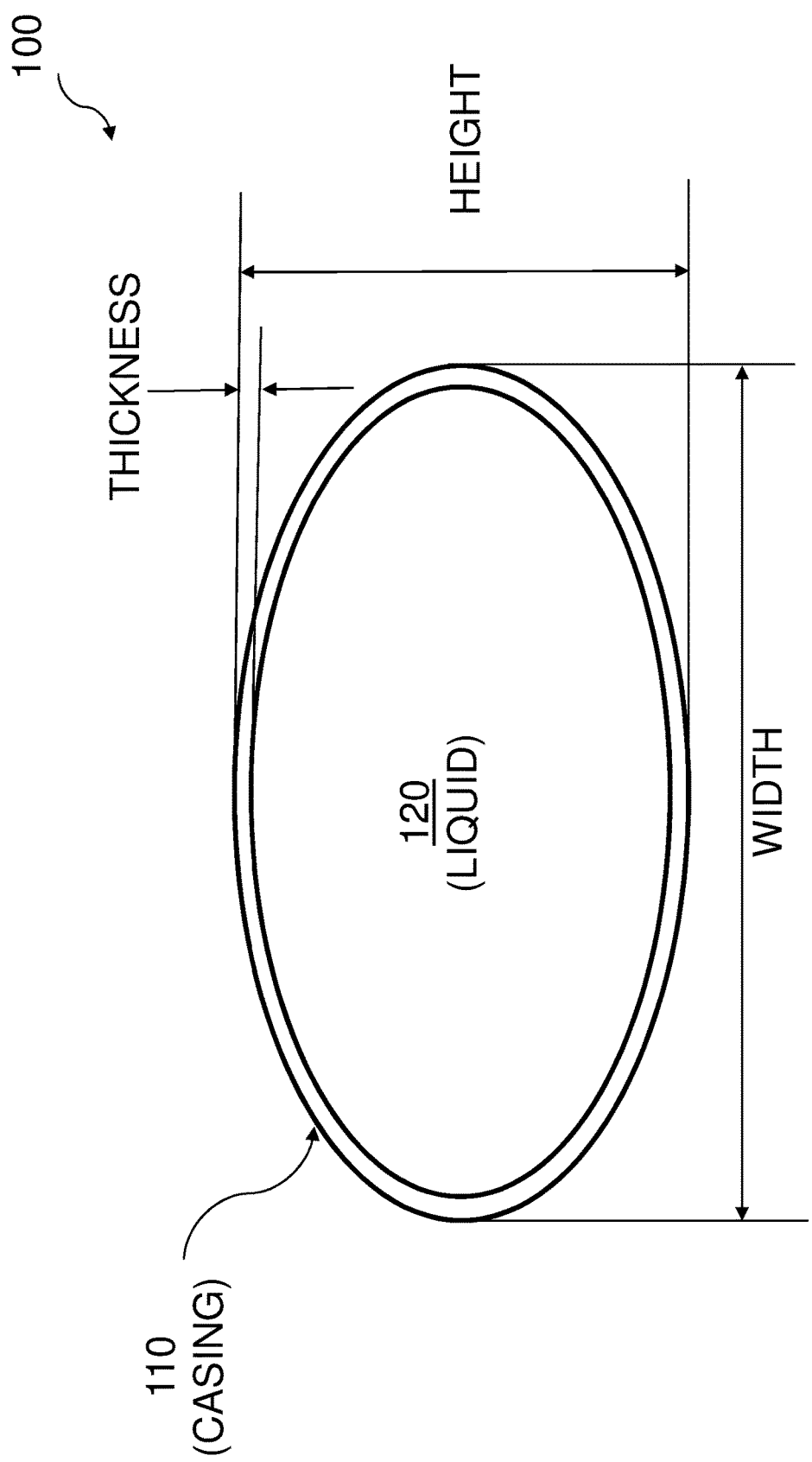
FIG. 1 illustrates a diagram of an example of an EHP constructed according to the principles of the disclosure.

The disclosure provides an edible pod that includes a liquid, such as water, for portable hydration. The edible hydration pod (EHP) disclosed herein encapsulates the liquid within a casing that is not only edible but can also be digestible and sturdy for transporting. The term edible as used herein means a material or materials of the EHP, including the casing, is safe to be consumed by an animal with little to no harm caused when ingested. The term digestible as used herein means the material or materials of the EHP when consumed by the animal is transformed or made available to provide nutritional and/or calorific content to the animal's diet. Accordingly, a person can carry an EHP in their pocket, pop it in their mouth, chew it to release the liquid, and swallow both the liquid and the casing. EHPs can also be given to other animals besides humans for hydration, such as to dogs, cats, horses, etc.

The liquid within the EHP is for hydration of animals in contrast to other fillings that are designed as, for example, sugary treats. As noted above, the liquid can be water, which is the liquid state of $H_2O$. The liquid can include vitamins or other nutrients (hereinafter collectively referred to as supplements) for additional benefits beyond hydration. The liquid can also include a flavoring. Accordingly, instead of water the liquid can be water that includes one or more supplements and/or one or more flavorings. The casing can also be flavored with a flavoring component and can include at least one supplement. Thus, the liquid and casing can both include at least one flavoring and can both include at least one supplement. The flavoring and/or supplements in the casing can be different than the flavoring and/or supplement in the liquid. The different flavorings can complement each other to provide a different flavor profile as the EHP is being chewed and the flavorings are mixed. In some embodiments, the casing can also include an excipient. One of more of the liquid, supplements, and/or flavorings can be directed to a particular animal, such as directed to a person or directed to a particular type of pet. For example, at least one of the liquids, supplements, and/or flavoring, or any combination thereof can be directed to a dog. Also, the liquids, supplements, and/or flavorings can be directed to different types of dogs or different aged dogs. Directed or directed to as used in this context means formulated, designed, and sized.

The flavorings can generally correspond to sweet, sour, salty, bitter, Umami, and any combination thereof. When EHPs are directed to dogs, the flavoring may be an Umami flavoring that suggests something savory, meaty or brothy. For dogs, the EHPs, such as in the casing, may also include a scent to entice a dog to take and bite into an EHP.

The liquid can either be manufactured within the casing when it is being processed or the liquid can be later inserted into or absorbed through a pre-manufactured casing. For example, a reciprocating die process can be used where casing pockets are filled with the liquid, and as the casing moves through the dies, they are sealed, shaped, and cut as filled with the liquid. A manufacturing system that also uses rotary dies can be used. The disclosure is not limited to reciprocating or rotary die encapsulation machines, as other commercially available machines that encapsulate liquids can be used.

The size and shape of the EHP can vary, and can correspond to the type of animal in which the edible pod is directed. As an example, the EHPs can be ellipsoidal in shape and have a width or diameter in a range of one to three inches. The sizes of EHPs can be based on the different sizes of particular animals. For example, the EHPs can have a width and height for small, medium, large, and/or extra-large dogs, wherein small dogs are between 2 to 23 pounds, medium dogs are between 24 to 58 pounds, large dogs are between 59 to 99 pounds, and extra-large dogs are 100 or more pounds. The size of the EHPs can be in the range of, for example, one to one and half inches for small dogs, one and half inches to two inches for medium dogs, two to two and half inches for large dogs, and two and half to three inches for extra-large dogs. For other animals, such as horses, the EHP sizes can be even greater than three inches.

In some examples, the size and/or shape of EHPs can depend on a desired amount of liquid to be enclosed. The EHPs can have other shapes besides an ellipsoid, such as a cube, cylinder, prism, pyramid, or other three dimensional shape. The different shapes can correspond to different liquids, supplements, or flavorings, or to a combination thereof. In some examples, the EHPs of different shapes can be shipped in a same package to provide variety to a user.

FIG. 1 illustrates a diagram of an example of an EHP 100 constructed according to the principles of the disclosure. The EHP 100 includes a casing 110 and a cavity 120. The casing 110 is an enclosure that is connected on all sides to form the cavity 120. As such, the cavity 120 is a volume defined by the casing 110. The casing 110 provides an encapsulated vessel for transport of a liquid and has at least one of the properties of strength, stability, edibility, and/or digestibility and can have all of these properties. Thus, the casing 110 is a three dimensional cover or shell that protects and encloses the content of the cavity 120.

The casing 110 is constructed of an edible material that can also be digestible by animals, for example, humans and/or pets. In addition to being edible and/or edible and digestible, the casing 110 is also sufficiently durable for at least some transportation without additional packaging. Thus, each EHP 100 does not need individual packaging. For example, the EHP 100 can be shipped in a package with other EHPs and then taken out of the package and carried or placed in a pocket or pouch until ready to be used. The thickness of the casing 110 can vary depending on the material and/or composition of the casing in order to provide sufficient durability. The thickness can also be based on the volume of liquid contained within the casing 110. The thickness can also vary depending on the animal in which the EHP 100 is directed to according to the ability to pierce the casing 110 when chewing. For example, the EHP 100 may be constructed for a large dog and the casing 110 can have a thickness that corresponds to the teeth and jaw power of large dogs. The bite force of an animal, measured in pounds per square inch (PSI), can be used as a basis for the strength of the casing 110. As noted above, the size of EHPs can also vary depending on the animal in which an EHP is directed. For example, the width of the EHP 100 can vary from, for example, from one to three inches and/or the height can also vary from one to three inches. For larger animals, such as horses, the width and/or height of the EHP can even be larger.

In some embodiments, the casing 110 can include or be made of natural or synthetic casing that are edible and digestible or edible and indigestible. Embodiments of the casing 110 can include edible polymer based hydrogels, such as synthetic hydrogels, e.g., capable of hydrating to contain 70, 80 or 90 percent by weight water. Some casing embodiment can include hydrocolloid polymers including protein-based edible protein-based films derived from cellulose, collagen, chitosan, gelatin, starch, soy, lentil, whey, peanut, mung bean or combinations thereof. Some embodiments of edible collagen or cellulose casings can be derived from the skin, intestines (e.g., submucosa) of animals such as lamb, sheep, hog, cattle or horses or cellulose or starch casings can be derived from plant products such as wood, bushes or grasses, corn, potatoes, or other vegetable products.

The casing 110 can include a gelatin, such as manufactured from the collagen of animal skin or bone. The casing 110 can also include a vegetable based material, for example, Hydroxypropylmethylcellulose (HPMC), or another type of a polymer formulated from cellulose. In one example, the casing 110 is constructed of a combination of a gelatin and a vegetable based material. For example, the casing 110 can include a gelatin and HPMC (also referred to as Hypromellose). The HPMC can be added to strengthen the gelatin to withstand damaging effects to the EHP 100 during manufacturing, transportation, and storage. The EHP 100 can be manufactured in various ways as understood by one skilled in the art. A desired concentration of HPMC or another strengthening component can be added to obtain optimum hardness and flexibility for both transporting/supporting and piercing through chewing. The casing 110 can include at least 2 g/kg of HPMC for strengthening and optimal durability. The casing 110 can be 35 to 55% gelatin with a sufficient amount of HPMC or another type of strengthener included. When the casing includes a gelatin, the bloom value of the gelatin can vary and can be based on the additional materials combined with the gelatin, such as a hardener or strengthener. The casing 110 can also include additional components, such as flavoring and/or supplements. In some examples, the casing 110 can include an inherent flavoring from the material in which the casing 110 is constructed. Excipients may also be included as desired or required. Various excipients can be used to provide structure for the EHP 100. Examples include: carbohydrates including monosaccharides, disaccharides and polysaccharides, and other carbohydrates such as, starches (hydroxyethylstarch), cyclodextrins and maltodextrins.

In addition to a width and height, the casing 110 also has a thickness. The thickness can be substantially constant throughout the casing 110. The thickness can also vary across the casing 110 due to manufacturing. The thickness can also vary by design to provide, for example, a weak point for release of the liquid when the casing 110 is bitten into or chewed. The thickness at a weak point can correspond to a bite force of an animal. Multiple weak points can be used. The number of weak points and/or size of a weak point can provide a faster release of the liquid to an animal compared to multiple chews of the casing 110. The number and/or size of the weak points can be balanced with the strength and the stability of the casing 110 needed for portability.

As noted above, the volume of the cavity 120 is defined by the casing 110 and can vary in different embodiments. The EHP 100 can be, for example, in multiple shapes formed by the casing 110, including an ellipsoid, such as a sphere. For an ellipsoid, the volume is $V=4/3\pi\, abc$, wherein a, b, and c, are the radii of each axes.

Figure 2:
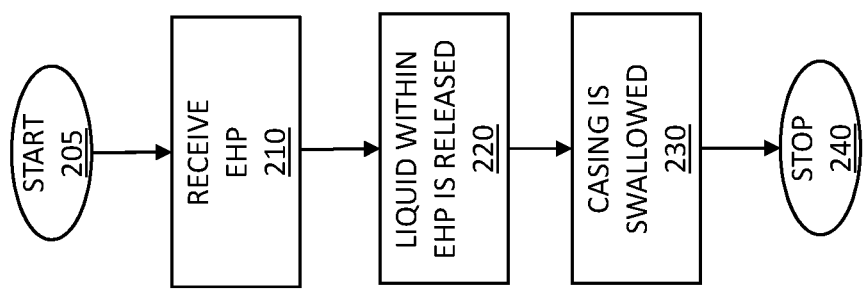
FIG. 2 illustrates a flow diagram of an example of a method of hydrating, employing an EHP, carried out according to the principles of the disclosure.

FIG. 2 illustrates a flow diagram of an example of a method 200 of hydrating, employing an EHP, carried out according to the principles of the disclosure. The method can be carried out by an animal, such as a human or a pet. The EHP that is used can be directed to a particular animal. For the below discussion, an animal will be used collectively. The method 200 starts in a step 205.

In a step 210, an animal receives an EHP in their mouth. A human can place the EHP in their own mouth. For a pet such as a dog, the EHP can be placed in the pet's mouth by a human.

In a step 220, liquid within the EHP is released in the mouth of the animal. The liquid can be released by the animal chewing on the casing, wherein teeth of the animal pierces the casing and releases the liquid that is then swallowed. The liquid can also be released through designated weak points, wherein pressure from a bite can be used to release the liquid with minimum chewing. The casing can include flavoring or scents that entices the animal to chew. The flavoring can be directed to a particular animal. In some examples, the casing can dissolve in the mouth and release the liquid. The released liquid provides hydration for the animal.

In a step 230, at least a portion of the casing is swallowed by the animal. The digestible casing is then processed through the alimentary canal of the animal. Advantageously, supplements in the casing, if included, are also processed. Supplements in the liquid, if included, can also be processed. The method then ends in a step 240. The method 200 can be repeated with other EHPs.

FIG. 3 illustrates a flow diagram of an example of a method 300 of making an EHP carried out according to the principles of the disclosure. The method 300, or at least a portion thereof, can be automated. One skilled in the art will understand that other methods may be employed to manufacture an EHP. The method 300 begins in a step 305.

In a step 310, a liquid is provided. The liquid can be provided from a different party or entity than who is making the EHP. The liquid can include one or more supplements and/or one or more flavoring and providing the liquid can include adding the one or more supplements and/or one or more flavoring to the liquid. The liquid can be water or another liquid formulated for hydration of animals or a particular animal In a step 320, a casing is provided. The casing can be in various shapes. The casing can be provided from a different party or entity than who is making the EHP or who provided the liquid. Providing the casing can include manufacturing the casing. The manufacturing can include adding at least one of a supplement or a flavoring to the casing. The manufacturing can also include constructing the casing from at least one of a gelatin or a vegetable based material. The vegetable based material can be Hypromellose. The amount of Hypromellose, or another strengthener, that is used can be based on the desired durability of the casing for optimal transporting and releasing of the liquid. The casing can be manufactured for a particular animal, wherein one or more of the supplements, flavoring, size, and/or strength of the casing, including all thereof, are for a particular animal, such as a human or dog.

In a step 330, the liquid is encapsulated by the casing. The encapsulation can be done via a conventional method. The encapsulating can include forming a cavity using the casing and filling the cavity with the liquid. The cavity can be formed using a vacuum drum machine. In some examples, the encapsulating can include freezing the liquid and sealing the casing around the frozen liquid. In other examples, the encapsulating can include filling the casing with the liquid, such as via a syringe.

The method 300 continues to a step 340 and ends. The method 300 can be repeated for additional EHPs. The method 300 can be performed simultaneously to manufacture multiple EHPs at the same or substantially same time.

In other embodiments, the casings can be manufactured (at various sizes and/or shapes) and shipped without liquid in them. The casings can then be soaked in a liquid, such as water, to become fully hydrated. The casings could be, for example, a solid material, such as a hydrogel ball, that can be soaked in water to become fully hydrated. Other materials that allow being filled with a liquid when soaked therein and then retaining the liquid within can also be used.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

The disclosure provides several aspects as noted in the Summary, including an EHP and a method of manufacturing an EHP. Several features are also reflected in dependent claims and each of the aspects can include the features individually or in combination.

What is claimed is:

1. A manufactured edible hydration pod, comprising: a formed casing having a thickness that varies by design; and frozen water, wherein the casing is an edible casing that is flavored for animals, includes a gelatin in the range of 35% to 55% and a polymer derived from cellulose, and is a transporting vessel that is sealed around the frozen water.

2. The edible hydration pod as recited in claim 1, wherein the frozen water includes at least one supplement for non-human animals.

3. The edible hydration pod as recited in claim 2, wherein the casing includes one or more designed weak points that have a different thickness than other portions of the casing.

4. The edible hydration pod as recited in claim 2, wherein the at least one supplement and a size of the casing are directed to dogs.

5. The edible hydration pod as recited in claim 1, wherein the casing has a diameter or width in a range of one inch to three inches.

6. The edible hydration pod as recited in claim 1, wherein the casing is chewable and the liquid is released when the casing is punctured during chewing.

7. The edible hydration pod as recited in claim 1, wherein the gelatin is manufactured from the collagen of animal skin or bone.

8. The edible hydration pod as recited in claim 1, wherein the casing is dissolvable when chewed, held in the mouth of an animal, and when orally ingested by an animal.

9. A method of manufacturing an enclosed edible hydration pod for a non-human animal, comprising:

provteid a liquid;

providing a casing for a particular non-human animal, wherein the casing includes a gelatin in the range of 35% to 55% and a polymer derived from cellulose;

strengthening the casing for transportation of the edible hydration pod;

forming a cavity using the casing;

filling the cavity with the liquid; and forming the enclosed edible hydration pod by encapsulating the liquid within the casing, wherein the casing is digestible by the particular non-human animal, and the forming the cavity, the filing the cavity, and the forming the enclosed edible hydration pod are performed by a manufacturer before the enclosed edible hydration pod is shipped.

10. The method as recited in claim 9, wherein the casing includes at least one weak point.

11. The method as recited in claim 9, wherein the encapsulating includes freezing the liquid and sealing the casing around the frozen liquid.

12. The method as recited in claim 9, further comprising adding at least one of a supplement or a flavoring to the liquid and adding at least one of a supplement or a flavor to the casing.

13. The method as recited in claim 9, further comprising shipping the enclosed edible hydration pod without individual packaging.

14. The method of claim 9, wherein the strengthening includes adding the polymer derived from cellulose.

15. The method as recited in claim 9, wherein the particular non-human animal is a dog and the various types of non-human animals are different types of dogs.

16. An enclosed, edible hydration pod directed to dogs, comprising: a formed casing; and a frozen liquid that is enclosed by sealing the casing around the frozen liquid, wherein the liquid is water and the casing is an edible and digestible casing that is flavored for dogs and is a transporting vessel for the liquid, wherein the casing includes a gelatin in the range of 35% to 55% and a polymer derived from cellulose, and at least a portion of a thickness of the casing corresponds to a bite force of dogs needed for piercing the casing.

17. The edible hydration pod as recited in claim 16, wherein the gelatin is manufactured from the collagen of animal skin or bone.

18. The edible hydration pod as recited in claim 16, wherein the casing includes one or more designed weak points that have a different thickness than other portions of the casing.

19. The edible hydration pod as recited in claim 18, wherein the casing includes at least two weak points.

* * * * *